United States Patent [19]

Roberts et al.

[11] Patent Number: 5,047,693
[45] Date of Patent: Sep. 10, 1991

[54] STARTING AID FOR AN ELECTRODELESS HIGH INTENSITY DISCHARGE LAMP

[75] Inventors: Victor D. Roberts, Burnt Hills; Sayed-Amr A. El-Hamamsy; Robert J. Thomas, both of Schenectady, all of N.Y.

[73] Assignee: General Electric Company, Schenectady, N.Y.

[21] Appl. No.: 527,502

[22] Filed: May 23, 1990

[51] Int. Cl.$^5$ ............................................ H05B 41/24
[52] U.S. Cl. .................................... 315/248; 315/344; 313/234
[58] Field of Search ...................... 315/248, 39, 111.51, 315/267, 344, 283; 313/151, 638, 161, 234

[56] References Cited

U.S. PATENT DOCUMENTS

| | | | |
|---|---|---|---|
| 4,810,938 | 3/1979 | Johnson et al. | 315/248 |
| 4,812,702 | 3/1990 | Anderson | 313/153 |
| 4,894,589 | 2/1990 | Borowiec | 315/248 |
| 4,894,590 | 2/1990 | Witting | 315/248 |
| 4,902,937 | 2/1990 | Witting | 315/248 |
| 4,959,592 | 9/1990 | Anderson | 315/248 |
| 4,982,140 | 1/1991 | Witting | 315/248 |

Primary Examiner—Eugene R. LaRoche
Assistant Examiner—Amir Zarabian
Attorney, Agent, or Firm—Jill M. Breedlove; James C. Davis, Jr.; Marvin Snyder

[57] ABSTRACT

A starting aid for an electrodeless high intensity discharge (HID) lamp comprises a spiral starting electrode which, at least during lamp starting, conforms to the shape of the arc tube so as to provide a relatively high capacitive starting current upon receipt of a radio frequency starting signal, resulting in a rapid transition from a glow discharge to a high intensity solenoidal discharge. At least one turn of the spiral starting electrode is preferably in contact with the portion of the arc tube nearest the arc discharge to be formed and is oriented so as to provide a capacitive starting current that flows in substantially the same location as the arc discharge to further ease lamp starting. In one embodiment, the spiral starting aid comprises first and second coil portions. The first coil portion conforms to the shape of the arc tube and has at least one turn disposed nearest the portion of the arc tube where the arc discharge is to be formed. The second coil portion has at least one turn in contact with the arc tube and the remaining turns extend outwardly therefrom. Once the lamp is started, the starting aid may be moved to a predetermined location away from the arc tube.

24 Claims, 3 Drawing Sheets

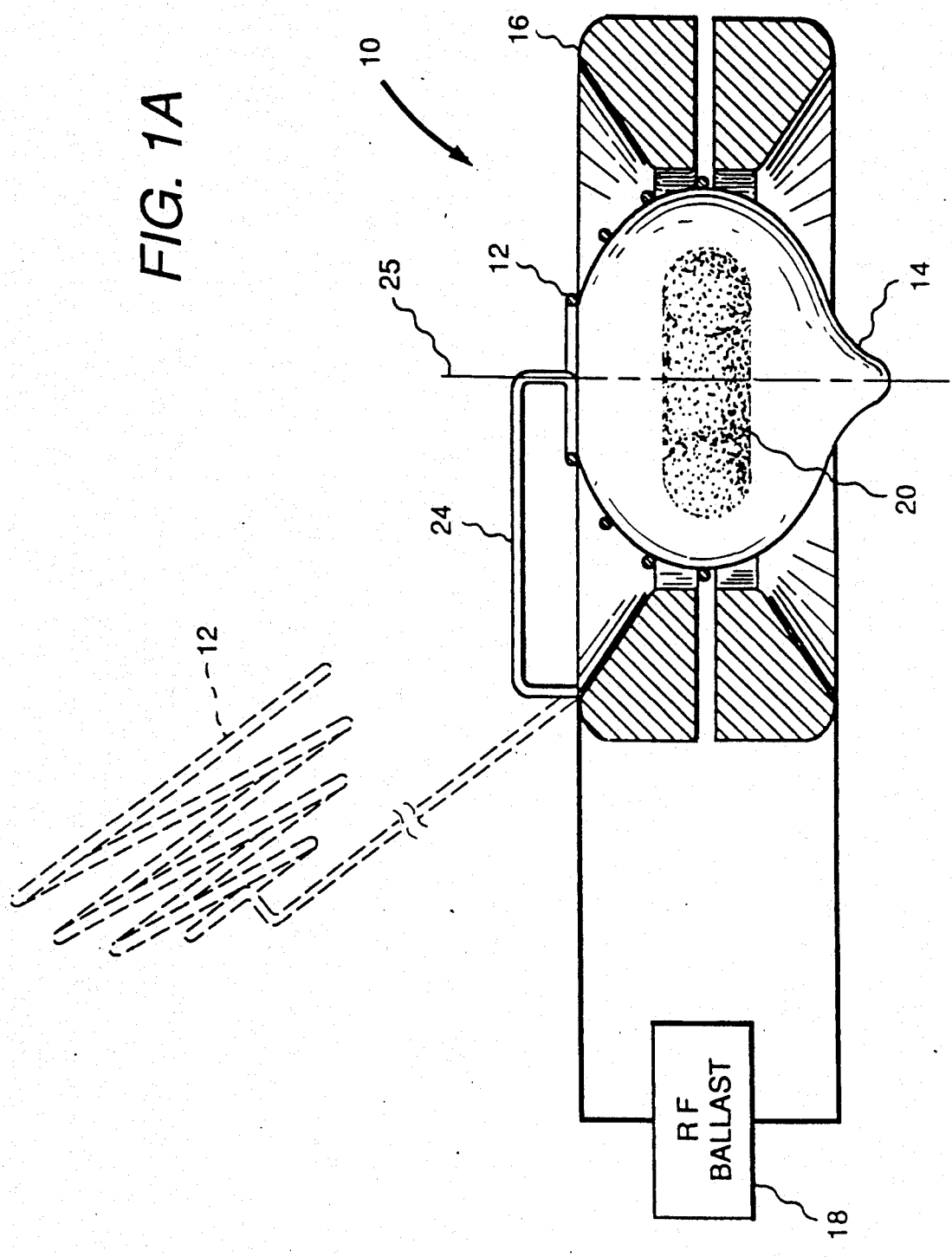

STARTING AID FOR AN ELECTRODELESS HIGH INTENSITY DISCHARGE LAMP

RELATED PATENT APPLICATIONS

This patent application is related to U.S. patent application of S. A. El-Hamamsy and R. J. Thomas, entitled "A Starting Circuit for an Electrodeless High Intensity Discharge Lamp", Ser. No. 527,500 and to U.S. patent application of S. A. El-Hamamsy and V. D. Roberts, entitled "A Starting Aid for an Electrodeless High Intensity Discharge Lamp", Ser. No. 527,503. The aforementioned patent applications, which are incorporated herein by reference, are each assigned to the instant assigned and filed concurrently herewith.

FIELD OF THE INVENTION

The present invention relates generally to high intensity discharge (HID) lamps. More particularly, the present invention relates to an improved starting aid for an electrodeless HID lamp.

BACKGROUND OF THE INVENTION

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. One way to overcome this shortcoming is to lower the gas pressure of the fill, for example, by first immersing the arc tube in liquid nitrogen so that the gas temperature is decreased to a very low value and then allowing the gas temperature to increase. As the temperature rises, an optimum gas density is eventually reached for ionization, or breakdown, of the fill to occur so that an arc discharge is initiated. However, the liquid nitrogen method of initiating an arc discharge is not practical for widespread commercial use.

More recent methods for starting electrodeless HID lamps entail using starting aids to capacitively couple the high voltage developed across the excitation coil turns into the arc tube. As a result of this voltage gradient, a capacitive current flows between the starting aid and the excitation coil, and hence through the arc tube, thereby ionizing the gaseous fill and producing a low current glow discharge therein. When the gas is sufficiently ionized, a transition is made from a relatively low current glow discharge to a relatively high current, high intensity solenoidal arc discharge. Such a starting aid may comprise, for example, a pair of capacitive starting electrodes, as described in H. L. Witting U.S. Pat. No. 4,902,937, issued Feb. 20, 1990, and assigned to the instant assignee, which patent is hereby incorporated by reference. Each starting electrode comprises a conductive ring which surrounds the arc tube and is connected to the excitation coil of the HID lamp. Coupling a high voltage signal between the pair of starting electrodes causes an electric field to be produced therebetween which is of sufficient magnitude to create a glow discharge in the arc tube due to the arc tube wall capacitance. Furthermore, as it has been determined that the application of relatively large fields directly to the arc tube via the starting aid may cause early arc tube degradation, heat sensitive members, e.g. bimetallic strips, are utilized for moving the starting electrodes away from the arc tube after initiating an arc discharge, thereby preserving the useful life of the lamp.

A spiral starting electrode for an electrodeless HID lamp is described in H. L. Witting U.S. Pat. No. 4,894,590 issued Jan. 16, 1990, and assigned to the instant assignee, which patent is hereby incorporated by reference. A single, conical-spiral-shaped starting electrode is positioned so that its narrower end is adjacent to, or on, the arc tube surface. The wider end of the starting electrode is positioned so that flux generated by the excitation coil cuts the turns of the spiral electrode, thereby generating a high voltage signal which results in a sufficiently high electric field gradient to create a glow discharge in the arc tube. A bimetallic strip is utilized to move the starting electrode away from the arc tube after an arc discharge is initiated therein.

Starting electrodes which are moved from a rest position to a starting location adjacent to the arc tube by piezoelectric means are described in J. C. Borowiec U.S. Pat. No. 4,894,589, issued Jan. 16, 1990, and assigned to the instant assignee, which patent is hereby incorporated by reference. The piezoelectric means is deactivated after an arc discharge is initiated, and the starting electrodes are moved back to the rest position. The piezoelectric means allows selective movement of the starting electrodes, thereby enabling the lamp to be restarted, if necessary, even if the arc tube is still hot.

In commonly assigned H. L. Witting U.S. Pat. No. 4,982,140, issued Jan. 1, 1991, another starting aid for an electrodeless HID lamp is described which comprises a first conductive coil disposed about a second conductive coil, each coil having a truncated-cone shape. The coils are wound in opposite directions so that voltages induced therein add together to provide a sufficiently high electric field gradient to initiate an arc discharge in the arc tube. A bimetallic support is used to move the starting aid between a starting position adjacent to the arc tube and a lamp-operating position at a predetermined location away from the arc tube. The Witting application is hereby incorporated by reference.

Although each of the hereinabove described starting aids is effective in initiating an arc discharge in an electrodeless HID lamp, it may be desirable in some applications to improve the starting capability of an electrodeless HID lamp even further by easing the transition from low current glow discharge to high current, high intensity, solenoidal discharge. Furthermore, it is desirable to provide a movable starting aid for an electrodeless HID lamp which is self-aligning with an optimal starting position.

OBJECTS OF THE INVENTION

Accordingly, it is an object of the present invention to provide a new and improved starting aid for an electrodeless HID lamp.

Another object of the present invention is to provide a starting aid for an electrodeless HID lamp which generates a relatively high capacitive starting current, thereby easing the transition from relatively low current glow discharge to high intensity solenoidal arc discharge.

Still another object of the present invention is to provide a movable starting aid for an electrodeless HID lamp which is substantially self-supporting and is self-aligning with an optimal starting position.

Yet another object of the present invention is to provide a starting aid for an electrodeless HID lamp which generates a capacitive starting current that flows in substantially the same location as the arc discharge to be initiated, thereby easing the transition from a relatively low current glow discharge to a high current, high intensity discharge.

SUMMARY OF THE INVENTION

In accordance with the present invention, a new and improved starting aid for an electrodeless HID lamp comprises a spiral starting electrode having at least two turns which substantially conform to the arc tube of the lamp at least during initiation of the arc discharge. Such a starting aid configuration advantageously provides a relatively large contact area between the arc tube and the starting aid. As a result, there is a relatively large capacitance between the starting aid and the arc tube which generates a relatively high capacitive starting current for initiating the arc discharge. Advantageously, a higher capacitive starting current results in an easier transition from a glow discharge to a high intensity solenoidal discharge. Furthermore, according to a preferred embodiment of the present invention, at least one turn of the spiral starting electrode is disposed adjacent to the portion of the arc tube nearest the arc discharge to be initiated and is oriented so that the capacitive starting current flows in substantially the same location as the arc discharge, thus further easing the transition from glow discharge to high intensity solenoidal discharge. Electrode moving means may be employed to move the starting electrode between the lamp-starting position in contact with the arc tube and a lamp-operating position a predetermined distance away from the arc tube.

According to one preferred embodiment of the present invention, the spiral starting electrode is coupled to an RF power supply either directly, or via an impedance matching network, or via the excitation coil for excitation thereby. In an alternative embodiment, the spiral starting electrode is separately excited by another RF power supply. In still another alternative embodiment, a multi-turn spiral starting aid is not directly connected to the RF power supply, but is excited by a voltage induced across the turns of the starting aid when a radio frequency signal is applied to the excitation coil. The spiral starting aid of this latter embodiment has a first coil portion shaped to conform to the arc tube with at least one turn disposed adjacent to the portion of the arc tube nearest the arc discharge, and a second coil portion having at least one turn in contact with the arc tube, the remaining turns of the second coil portion extending outwardly from the arc tube.

BRIEF DESCRIPTION OF THE DRAWINGS

The features and advantages of the present invention will become apparent from the following detailed description of the invention when read with the accompanying drawings in which:

FIG. 1A is a partially cutaway side view of an electrodeless HID lamp employing a starting aid in accordance with a preferred embodiment of the present invention;

DETAILED DESCRIPTION OF THE INVENTION

Figure 1B:
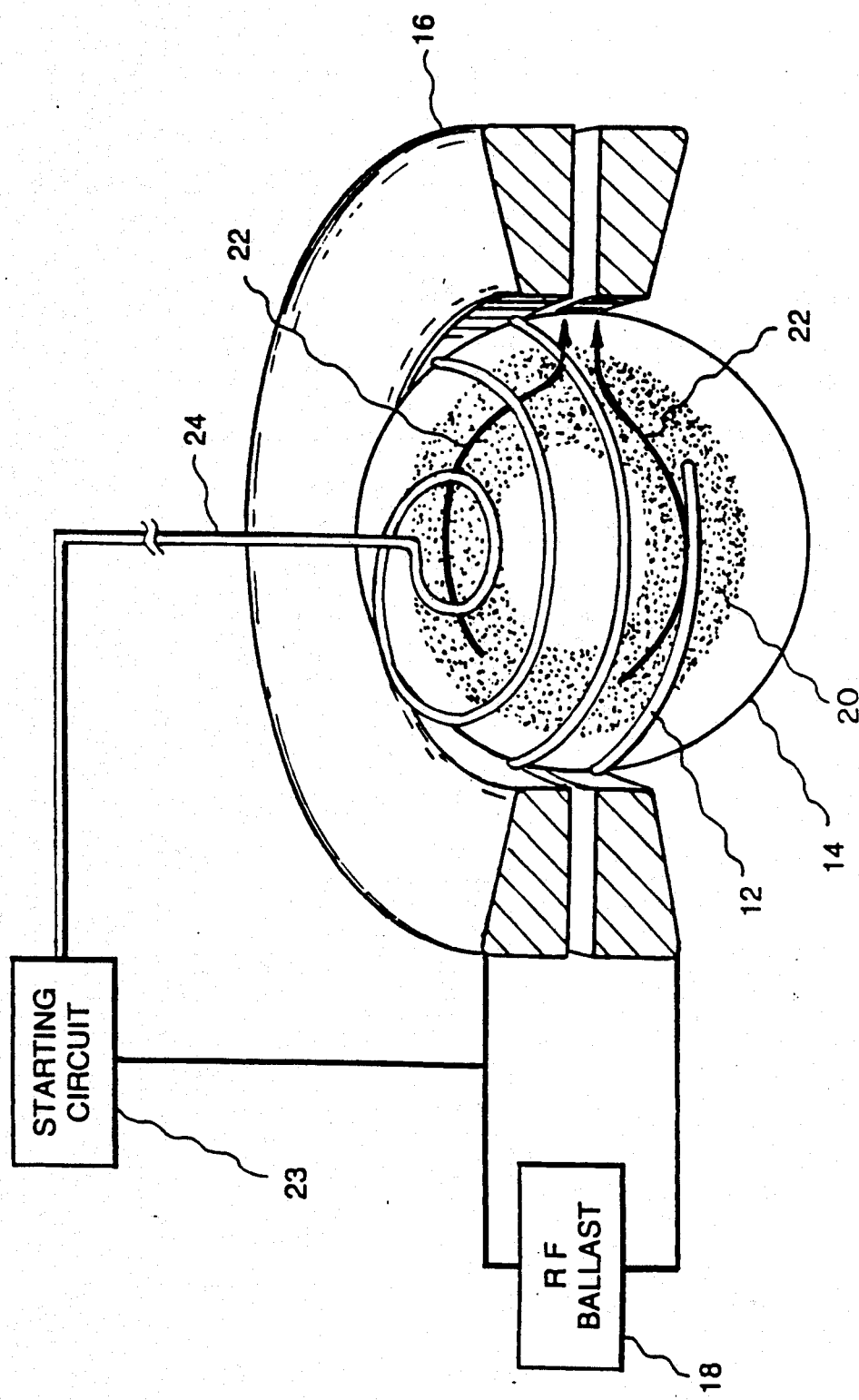
FIG. 1B is a partial isometric view of an electrodeless HID lamp employing a starting aid such as that of FIG. 1A, but which is excited by a separate and independent starting circuit.

FIGS. 1A and 1B illustrate an electrodeless HID lamp 10 employing a starting aid 12 in accordance with a preferred embodiment of the present invention. Lamp 10 includes an arc tube 14 preferably formed of a high temperature glass, such as fused quartz, or an optically transparent ceramic, such as polycrystalline alumina. An excitation coil 16 surrounds arc tube 14 and is coupled to a radio frequency (RF) ballast 18 for exciting a toroidal arc discharge 20 therein. By way of example, arc tube 14 is shown as having a substantially ellipsoid shape. However, arc tubes of other shapes may be desirable, depending upon the application. For example, arc tube 14 may be spherical (as illustrated in FIG. 1B) or may have the shape of a short cylinder, or "pillbox", having rounded edges, if desired.

Arc tube 14 contains a fill in which an arc discharge having a substantially toroidal shape is excited during lamp operation. A suitable fill is described in U.S. Pat. No. 4,810,938 of P. D. Johnson. J. T. Dakin and J. M. Anderson, issued on Mar. 7, 1989, and assigned to the instant assignee. The fill of the Johnson et al. patent comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. Another suitable fill is described in H. L. Witting U.S. Pat. No. 4,972,120, issued Nov. 20, 1990, and assigned to the instant assignee, which patent application is hereby incorporated by reference. The fill of the Witting application comprises a combination of a lanthanum halide, a sodium halide, a cerium halide and xenon or krypton as a buffer gas. For example, a fill according to the Witting application may comprise a combination of lanthanum iodide, sodium iodide, cerium iodide, and 250 torr partial pressure of xenon.

As illustrated in FIGS. 1A and 1B, RF power is applied to the HID lamp by RF ballast 18 via excitation coil 16 coupled thereto. Excitation coil 16 is illustrated as comprising a two-turn coil having a configuration such as that described in commonly assigned, copending G. A. Farrall U.S. patent application, Ser. No. 493,266, filed Mar. 14, 1990, which patent application is hereby incorporated by reference. Such a coil configuration results in very high efficiency and causes only minimal light blockage from the lamp. The overall shape of the excitation coil of the Farrall application is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned J. M. Anderson U.S. Pat. No. 4,812,702, issued Mar. 14, 1989, which patent is hereby incorporated by reference. In particular, the Anderson patent describes a coil having six turns which are arranged to have a substantially V-shaped cross section on each side of a coil center line. Still another suitable excitation coil may be of solenoidal shape, for example.

In operation, RF current in coil 16 results in a time-varying magnetic field which produces within arc tube 14 an electric field that completely closes upon itself. Current flows through the fill within arc tube 14 as a result of this solenoidal electric field, producing toroidal arc discharge 20 therein. Suitable operating frequencies for RF ballast 18 are in the range from 0.1 to 30 megahertz (MHz), an exemplary operating frequency being 13.56 MHz.

Starting aid 12 is illustrated in FIGS. 1A and 1B as comprising a spiral electrode having a plurality of turns shaped to conform to arc tube 14 at least during initiation of the arc discharge. In particular, spiral starting electrode 12 has at least two, but preferably more, turns in contact with the arc tube during lamp starting. Since capacitance is directly proportional to contact area, there is a relatively high capacitance between the starting aid and the arc tube, resulting in a relatively high capacitive starting current upon application of a radio frequency signal to the starting aid. Hence, the transition from glow discharge to high intensity solenoidal arc discharge is made substantially instantaneously. Furthermore, preferably at least one turn of spiral electrode 12 is in contact with the portion of the arc tube nearest the arc discharge to be formed during lamp starting. In this way, the capacitive starting current flows in substantially the same location as the arc discharge, thus making lamp starting even easier, as described in the El-Hamamsy and Roberts application, cited hereinabove. The capacitive starting current is represented in FIG. 1B by arrows 22.

In FIG. 1A, starting electrode 12 is illustrated as being coupled to excitation coil 16 for excitation by RF ballast 18 coupled thereto. Alternatively, as described hereinabove, starting electrode 12 may be coupled to RF ballast 18 either directly or via an impedance matching network. In another alternative embodiment, as shown in FIG. 1B, a starting circuit 23, which is separate and independent from RF ballast 18, is used to excite the starting aid. A suitable starting circuit is described in the copending U.S. patent application of S. A. El-Hamamsy and R. J. Thomas, cited hereinabove. In either case (i.e. FIGS. 1A and 1B), when an RF signal is applied to starting electrode 12, a capacitive starting current (represented by arrows 22 in FIG. 1B) is initiated in arc tube 14 which acts to ionize the gaseous fill therein, thus producing a relatively low current glow discharge. Once the fill is sufficiently ionized, the glow discharge transitions to a relatively high current, high intensity solenoidal arc discharge. Additionally, the starting aid of the present invention advantageously provides a capacitive starting current that flows in substantially the same location as the arc discharge, thus making the aforesaid transition easier and hence occur substantially instantaneously. Moreover, by positioning starting aid 12 in contact with arc tube 14 during lamp starting, breakdown of the fill contained within arc tube 14 is ensured, while breakdown of the air outside the arc tube is avoided.

After arc discharge 20 is initiated, starting electrode 12 may be moved by electrode moving means 24 to a predetermined location away from arc tube 14, if desired. In this way, starting electrode 12 does not substantially block light emission, interfere with the thermal balance of the arc tube, or contribute to arc tube degradation. Electrode moving means 24 may comprise, for example, a heat sensitive support which is suitably curved at normal ambient temperatures to cause starting electrode 12 to conform to the surface of arc tube 14. An exemplary heat sensitive support comprises a bimetal strip which undergoes differential expansion in response to the receipt of heat energy. In particular, when arc tube 14 becomes sufficiently hot after initiation of the high intensity arc discharge therein, the curvature of the bimetal strip changes so as to move starting electrode 12 away from the arc tube (as shown in phantom in FIG. 1A). After lamp operation ceases and the arc tube cools sufficiently, the bimetal strip assumes its original shape, and hence the starting electrode is moved back to the starting position on arc tube 14.

In an alternative embodiment, electrode moving means 24 comprises a piezoelectric bender responsive to an actuating DC voltage for moving the starting aid between the lamp-starting and lamp-operating positions. In particular, when the actuating voltage is applied to the piezoelectric bender, the starting electrode is moved to the starting position adjacent to the arc tube. The actuating voltage is reduced or removed once the arc discharge is initiated, and the starting electrode is moved back to its original position, i.e. the lamp-operating position. Such a piezoelectric bender is described in J. C. Borowiec U.S. Pat. No. 4,894,589, cited hereinabove.

Advantageously, in addition to providing a relatively large contact area between the starting aid and the arc tube, the starting aid of the present invention is self-aligning and substantially self-supporting. That is, the spiral electrode is preferably comprised of a sufficiently flexible conductive material, such as nickel, NiChrome, or platinum, so that starting electrode 12 conforms to the arc tube when it is moved in contact therewith. Hence, each time the spiral starting electrode is moved to the lamp-starting position surrounding arc tube 14, the starting electrode and arc tube axes 25 coincide. This is the optimal starting position for the starting electrode for at least two reasons. First, the contact area between the starting electrode and the arc tube is maximized. Second, at least one turn of the spiral electrode is in contact with the portion of the arc tube nearest the arc discharge to be formed.

Figure 2:
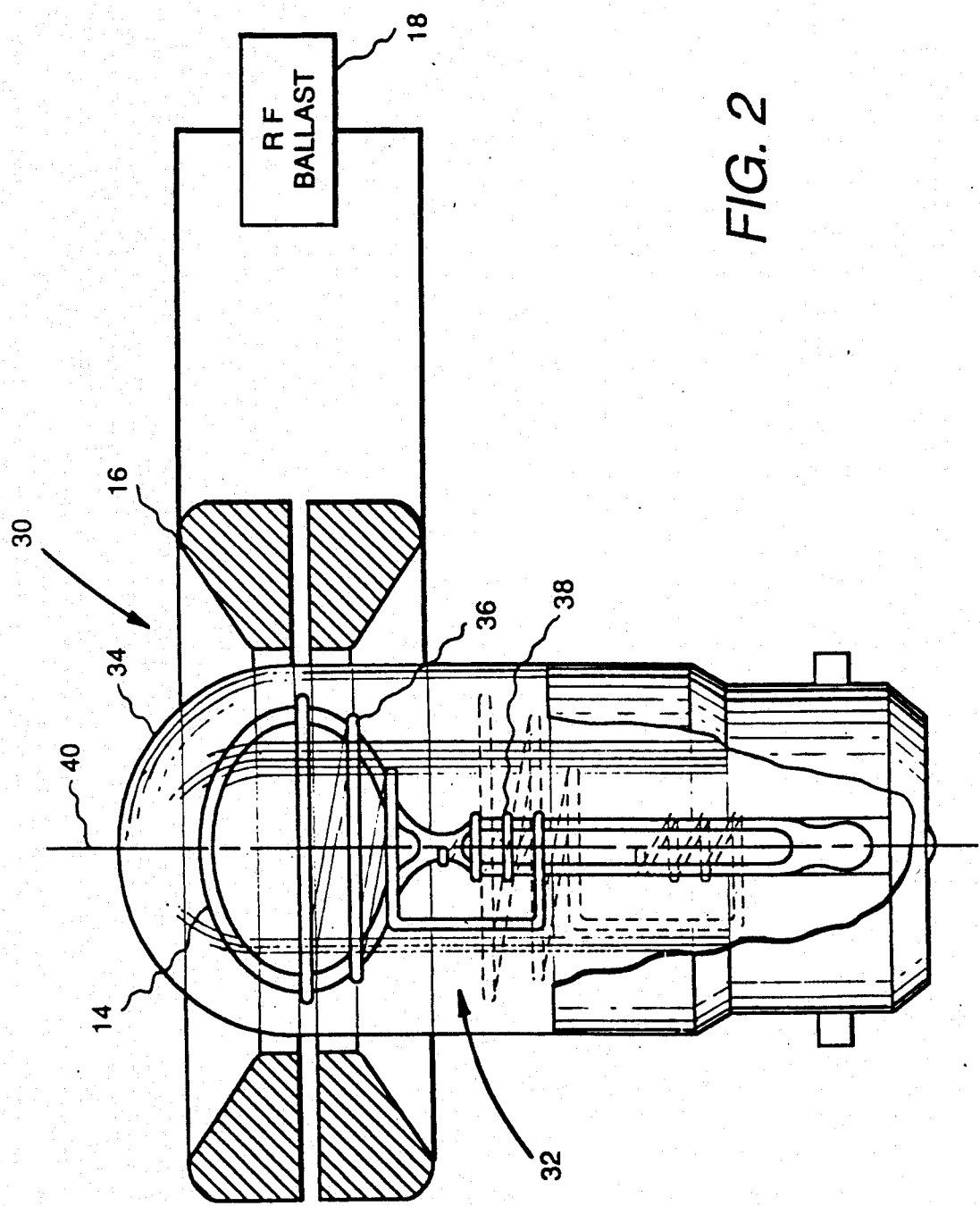
FIG. 2 is a partially cutaway side view of an electrodeless HID lamp employing a starting aid in accordance with an alternative embodiment of the present invention.

FIG. 2 illustrates an HID lamp 30 employing a starting aid 32 in accordance with an alternative embodiment of the present invention. As illustrated, lamp 30 includes an outer, light-transmissive envelope 34 enclosing arc tube 14 and starting aid 32. Starting aid 32 has a first coil portion 36 which, at least during lamp starting, conforms to the shape of arc tube 14 and has at least one turn disposed nearest the portion of the arc tube where the arc discharge is to be formed. Starting aid 32 also has a second coil portion 38 which comprises a continuation of first coil portion 36 and shares a common longitudinal axis 40 therewith. Second coil portion 38 preferably has at least one turn in contact with the arc tube and the remaining turns extend outwardly therefrom. In operation, when an RF signal is applied to excitation coil 16, the resultant magnetic flux induces a high voltage across the turns of the first and second coil portions of starting aid 32, thereby providing a sufficiently high electric field to create a glow discharge in arc tube 14 which quickly transitions to a high intensity arc discharge.

Although starting aid 32 is illustrated in FIG. 2 as being fixed and situated toward the bottom portion of arc tube 14, such a starting aid may alternatively be situated with its first coil portion disposed about the upper portion of arc tube 14 (similar to starting electrode 12 of FIGS. 1A and 1B) with its second coil portion extending upwardly therefrom. Moreover, with the starting electrode in either position , electrode moving means, such as those described hereinabove, may be employed to move starting electrode 32 between lamp-starting and lamp-operating positions, if desired. For example, starting electrode 36 may be moved from the starting position to the lamp-operating position, as shown in phantom. Such a movable starting electrode would advantageously be both self-aligning and substantially self-supporting.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A starting aid for an electrodeless high intensity discharge lamp which includes an excitation coil situated about an arc tube for exciting an arc discharge in an ionizable fill contained in said arc tube, said starting aid comprising:
   a spiral starting electrode having a plurality of turns for which, at least during initiation of the arc discharge in said arc tube, at least two of said turns substantially conform to the shape of said arc tube, and at least one of said turns is positioned adjacent to the portion of said arc tube nearest the arc discharge to be initiated and is oriented so as to provide a capacitive starting current in said arc tube that flows in substantially the same location as the arc discharge; and
   means for coupling a radio frequency signal to said spiral starting electrode.

2. The starting aid of claim 1 wherein said spiral electrode comprises a first coil portion and a second coil portion continuous therewith, said first coil portion substantially conforming to the shape of said arc tube at least during initiation of the arc discharge, said second coil portion being positioned so that at least one turn thereof is adjacent to said arc tube at least during initiation of the arc discharge, said first and second coil portions sharing a common longitudinal axis.

3. The starting aid of claim 1, further comprising electrode moving means for moving said starting electrode to a predetermined location away from said arc tube after the arc discharge is initiated.

4. The starting aid of claim 3 wherein said electrode moving means comprises heat responsive means for moving said starting electrode to said predetermined location upon receipt of heat energy from said arc tube, said heat responsive means moving said starting electrode back toward aid arc tube upon sufficient reduction in receipt of heat energy from said arc tube.

5. The starting aid of claim 4 wherein said heat responsive means comprises bimetallic support means.

6. The starting aid of claim 3 wherein said electrode moving means comprises piezoelectric bender means for moving said starting electrode adjacent to said arc tube in response to a voltage stimulus, said piezoelectric bender means moving said starting electrode to said predetermined location away from said arc tube upon sufficient reduction in said voltage stimulus.

7. The starting aid of claim 2, further comprising electrode moving means for moving said starting electrode to a predetermined location away from said arc tube after the arc discharge is initiated.

8. The starting aid of claim 7 wherein said electrode moving means comprises heat responsive means for moving said starting electrode to said predetermined location upon receipt of heat energy from said arc tube, said heat responsive means moving said starting electrode back toward said arc tube upon sufficient reduction in receipt of heat energy from said arc tube.

9. The starting aid of claim 8 wherein said heat responsive means comprises bimetallic support means.

10. The starting aid of claim 7 wherein said electrode moving means comprises piezoelectric bender means for moving said starting electrode adjacent to said arc tube in response to a voltage stimulus, said piezoelectric bender means, moving said starting electrode to said predetermined location away from said arc tube upon sufficient reduction in said voltage stimulus.

11. An electrodeless high intensity discharge lamp, comprising:
   a light-transmissive arc tube for containing a fill;
   an excitation coil disposed about said arc tube and coupled to a radio frequency power supply for exciting an arc discharge in said fill;
   a spiral starting electrode having a plurality of turns for which, at least during initiation of the arc discharge in said arc tube, at least two of said turns substantially conform to the shape of said arc tube, and at least one of said turns is positioned adjacent to the portion of said arc tube nearest the arc discharge to be initiated and is oriented so as to provide a capacitive starting current in said arc tube that flows in substantially the same location as the arc discharge; and
   means for coupling a radio frequency signal to said starting electrode.

12. The lamp of claim 11 wherein said spiral electrode comprises a first coil portion and a second coil portion continuous therewith, said first coil portion substantially conforming to the shape of said arc tube at least during initiation of the arc discharge, said second coil portion being positioned so that at least one turn thereof is adjacent to said arc tube at least during initiation of the arc discharge, said first and second coil portions sharing a common longitudinal axis.

13. The lamp of claim 11, further comprising electrode moving means for moving said starting electrode to a predetermined location away from said arc tube after the arc discharge is initiated.

14. The lamp of claim 13 wherein said electrode moving means comprises heat responsive means for moving said starting electrode to said predetermined location upon receipt of heat energy from said arc tube, said heat responsive means moving said starting electrode back toward said arc tube upon sufficient reduction in receipt of heat energy from said arc tube.

15. The lamp of claim 14 wherein said heat responsive means comprises bimetallic support means.

16. The starting aid of claim 13 wherein said electrode moving means comprises piezoelectric bender means for moving said starting electrode adjacent to said arc tube in response to a voltage stimulus, said piezoelectric bender means moving said starting electrode to said predetermined location away from said arc tube upon sufficient reduction in said voltage stimulus.

17. The lamp of claim 12, further comprising electrode moving means for moving said starting electrode to a predetermined location away from said arc tube after the arc discharge is initiated.

18. The lamp of claim 17 wherein said electrode moving means comprises heat responsive means for moving said starting electrode to said predetermined location upon receipt of heat energy from said arc tube, said heat responsive means moving said starting electrode back toward said arc tube upon sufficient reduction in receipt of heat energy from said arc tube.

19. The lamp of claim 18 wherein said heat responsive means comprises bimetallic support means.

20. The starting aid of claim 17 wherein said electrode moving means comprises piezoelectric bender means for moving said starting electrode adjacent to said arc tube in response to a voltage stimulus, said piezoelectric bender means moving said starting electrode to said predetermined location away from said arc tube upon sufficient reduction in said voltage stimulus.

21. The lamp of claim 11 wherein the radio frequency signal coupling means comprises means for coupling said starting electrode to, said radio frequency power supply.

22. The lamp of claim 21 wherein said means for coupling said starting electrode to said radio frequency power supply comprises means for coupling said starting electrode to said excitation coil.

23. The lamp of claim 11 wherein the radio frequency signal coupling means comprises means for coupling said starting electrode to a second radio frequency power supply for providing said radio frequency signal to said starting electrode, said excitation coil and said electrode being separately excited.

24. The lamp of claim 11, further comprising an outer light transmissive envelope enclosing said arc tube, said excitation coil being situated outside said envelope in the vicinity of said arc tube.

* * * * *